Feb. 1, 1966      W. T. SHERWOOD      3,232,191
LOW-SCENE-BRIGHTNESS SIGNAL FOR PHOTOGRAPHIC CAMERAS
Filed Nov. 20, 1962
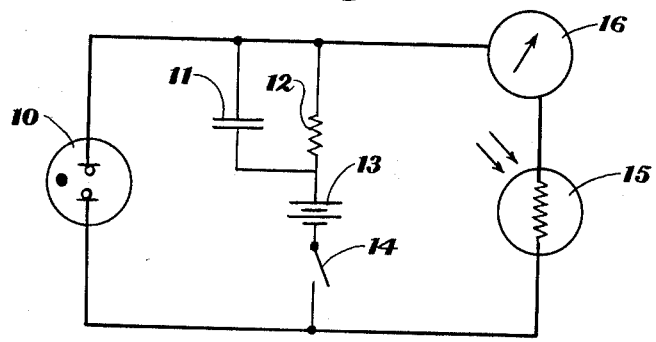
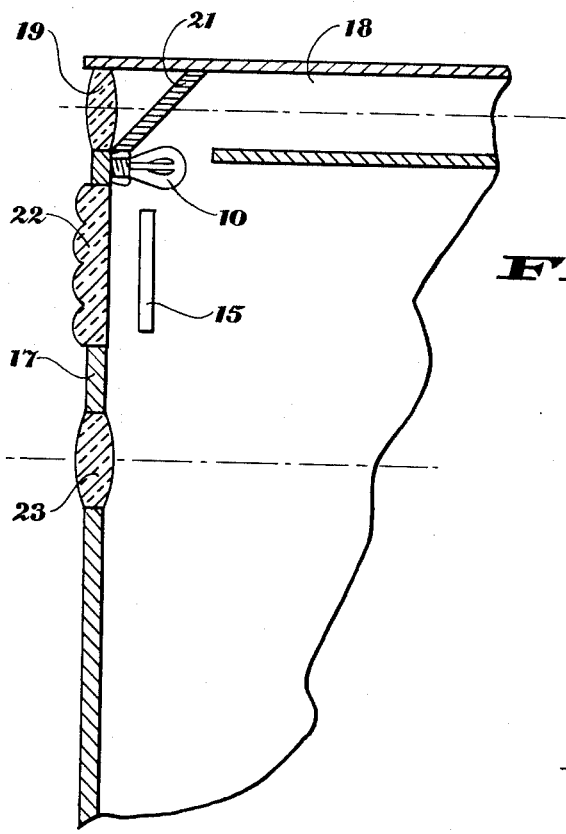
William T. Sherwood
INVENTOR.
BY R. Frank Smith
Eugene S. Stephens
ATTORNEYS

United States Patent Office 3,232,191
Patented Feb. 1, 1966

3,232,191
LOW-SCENE-BRIGHTNESS SIGNAL FOR
PHOTOGRAPHIC CAMERAS
William T. Sherwood, Rochester, N.Y., assignor to Eastman Kodak Company, Rochester, N.Y., a corporation of New Jersey
Filed Nov. 20, 1962, Ser. No. 238,936
8 Claims. (Cl. 95—10)

The present invention relates to a low-scene-brightness signal for a photographic camera and more particularly concerns a flashing light low-scene-brightness signal cooperating with or incorporating into a camera's photoelectric exposure control system.

It is an object of this invention to inform a camera operator that the brightness of the scene or field at which the camera is aimed is below a predetermined low level.

Another object of this invention is to flash an electric lamp automatically in response to the sensing of low-field-brightness by a camera's exposure meter or other photosensitive device.

Another object of the invention is to display a flashing light low-field-brightness signal in the viewfinder of a camera when field brightness is less than a predetermined low value.

Another object of the invention is to electronically control an improved, flashing light, low-scene-brightness signal for a camera.

Another object of the invention is to economically provide a camera with a flashing light low-scene-brightness signal which is simple and reliable.

These and other objects of the invention are accomplished by an electronically controlled, normally inactuated relaxation oscillator circuit including an electric lamp positioned so that a flashing light from the lamp is visible to the camera operator. A control circuit including a photoresponsive element illuminatable by scene light is coupled to the oscillator circuit for permitting an oscillating current in the latter to energize the lamp intermittently for producing a flashing light signal only when field brightness is below a predetermined low value. Such a signal can be transmitted to the camera viewfinder, and such a control circuit can include an electric measuring instrument controlling an exposure value setting device.

The invention will be more fully understood from the following description with reference to the accompanying drawings, wherein:

FIG. 1 shows a schematic circuit diagram of a flashing light low-field-brightness signal according to this invention; and FIG. 2 shows a partially schematic sectional side view of a camera provided with the invention.

An electric lamp, shown in FIG. 1 as a neon glow lamp 10, is electrically connected into a relaxation oscillator circuit including capacitor 11, resistor 12, battery 13, and switch 14. An oscillating current is produced in this circuit as the capacitor 11 periodically charges through lamp 10 until the potential across the lamp 10 is insufficient to pass current and the lamp is extinguished while the capacitor 11 discharges through resistor 12. Such an oscillating current intermittently energizes lamp 10 to its striking potential or ionization potential to produce a flashing light.

Connected to the relaxation oscillator circuit is a control circuit including a photoresponsive element shown as photoconductive cell 15 which is illuminated by scene light and an electric measuring instrument shown as galvanometer 16. Exposure values may be set by members (not shown) moving under control of instrument 16 as is well known in the exposure control art.

With switch 14 closed battery 13 produces a control circuit current which is controlled by photoconductive cell 15 in response to the field brightness value, and the control circuit current causes a deflection of instrument 16 by which exposure values may be set or controlled as a function of scene brightness. With no light falling on photoconductive cell 15, the control circuit is effectively open, and the oscillator circuit produces the above-described oscillating current for energizing the lamp 10 to produce a flashing light. When the luminous flux falling on cell 15 exceeds a predetermined low value, the lamp 10 cannot reach its striking potential because of the current in the control circuit which produces a potential across cell 15 and instrument 16 of less than the lamp striking potential and prevents the capacitor 11 from discharging through the resistor 12, and thus the oscillating current causing the flashing of lamp 10 is stopped. Conversely, when luminous flux falling on cell 15 is less than the predetermined low value, current in the control circuit is insufficient to maintain a potential across resistor 12 large enough to prevent the discharge of the capacitor 11 through the resistor 12, or to limit the potential across cell 15 and instrument 16 to less than lamp striking potential and hence the oscillator circuit produces the oscillating current which causes the flashing of lamp 10. By proper selection of parameters for such circuits, the predetermined low value of illumination below which the lamp 10 will flash can correspond to the minimum field brightness suitable for a photographic exposure upon the photosensitive film in the camera. In one embodiment where battery 13 supplies 70 volts, satisfactory parameters were ½ microfarad for capacitor 11 and ½ megohm for resistor 12.

In FIG. 2 the lamp 10 is shown supported upon a camera body 17 at a location adjacent the camera's viewfinder 18, the front lens of which is illustrated as lens 19. A paratially silvered mirror 21 transmits the flashing light signal to the camera operator by reflecting light from lamp 10 into the viewfinder 18.

Photoconductive cell 15 is illuminated by field light passing through window 22, and the camera's objective is illustrated as lens 23.

Although the invention has been described in detail with reference to a preferred embodiment thereof, it will be understood that variations and modifications can be effected within the spirit and scope of the invention as described hereinabove and as defined in the appended claims.

I claim:
1. In combination with a photographic camera, a flashing light low-scene-brightness signal device comprising an electric lamp supported by said camera such that light therefrom is visible to the camera operator; a normally inactuated relaxation oscillator circuit adapted, upon actuation thereof, for energizing said lamp intermittently to produce a flashing light, said oscillator circuit including a capacitor means, a resistor means connected in parallel with said capacitor means, and a battery means operatively connected in said circuit; and a control circuit including a photocell illuminatable by scene light and coupled to said oscillator circuit for actuating the latter only in response to a relatively low level of illumination of said element.
2. The device of claim 1 wherein said camera has a viewfinder and light from said lamp is visible in said viewfinder.
3. The device of claim 1 wherein said electric lamp is a neon glow lamp.
4. The device of claim 1 wherein said control circuit includes electric measuring means movable in response to said photoresponsive element.
5. The device of claim 4 wherein an exposure value setting means is controlled by said electric measuring means.

6. In combination with a photographic camera, means for flashing a lamp in response to low field brightness comprising, an electric lamp having a striking potential and supported by said camera such that light therefrom is visible to the camera operator; a relaxation oscillator electrically in circuit with said lamp and arranged for periodically varying the potential across said lamp so as to intermittently strike and extinguish said lamp to produce a flashing light, said oscillator circuit including a capacitor means, resistor means connected in parallel with said capacitor means, and a battery means operatively connected in said circuit; and a photocell illuminatable by field light and electrically in circuit with said lamp for preventing the potential across said lamp from reaching said striking potential whenever field brightness exceeds a predetermined low value.

7. The combination of claim 6 wherein said lamp is a gas filled diode.

8. The combination of claim 7 wherein said camera has a viewfinder and light from said lamp is visible in said viewfinder.

References Cited by the Examiner

UNITED STATES PATENTS

| | | | |
|---|---|---|---|
| 1,876,109 | 9/1932 | Van der Pol | 331—66 X |
| 1,934,726 | 11/1933 | McCreary | 331—66 X |
| 2,894,173 | 7/1959 | Paradise | 331—66 X |
| 2,971,432 | 2/1961 | Blank | 352—171 |
| 3,003,389 | 10/1961 | Stimson | 95—10 |
| 3,143,047 | 7/1962 | Sherwood | 95—10 |

NORTON ANSHER, *Primary Examiner.*

EMIL G. ANDERSON, *Examiner.*